United States Patent [19]

Zähner et al.

[11] Patent Number: 5,062,547

[45] Date of Patent: Nov. 5, 1991

[54] VOLUME MEASUREMENT AND DOSAGE DEVICE

[75] Inventors: Paul Zähner; Karl Kaempf, both of Herisau, Switzerland

[73] Assignee: Metrohm AG, Switzerland

[21] Appl. No.: 520,817

[22] Filed: May 9, 1990

[30] Foreign Application Priority Data

May 26, 1989 [CH] Switzerland .......................... 1990/89

[51] Int. Cl.⁵ .............................................. G01N 1/00
[52] U.S. Cl. .................................. 222/144.5; 222/330; 222/333; 222/383; 422/100
[58] Field of Search ............ 222/129, 132, 144, 144.5, 222/333, 372, 383, 162, 163, 167, 380, 381, 504, 330, 331; 422/100; 73/864.16-864.18

[56] References Cited

U.S. PATENT DOCUMENTS

| | | | |
|---|---|---|---|
| 2,872,082 | 2/1959 | Neugebauer | 222/548 X |
| 3,543,965 | 12/1970 | Lehmann | 222/144.5 X |
| 3,568,888 | 3/1971 | Baldoni | 222/144.5 X |
| 4,171,070 | 10/1979 | Colgate et al. | 222/144.5 X |
| 4,760,939 | 8/1988 | Ball et al. | 222/23 |

FOREIGN PATENT DOCUMENTS 1481521 8/1977 European Pat. Off. .
0096089 6/1982 European Pat. Off. .
0188453 1/1989 European Pat. Off. .
371496 3/1923 Fed. Rep. of Germany .
2425382 12/1979 France .

Primary Examiner—Michael S. Huppert
Assistant Examiner—Kenneth DeRosa
Attorney, Agent, or Firm—Shoemaker and Mattare, Ltd.

[57] ABSTRACT

A volume measurement and dosage device possesses a cylinder- piston- and valve-system (4). With this system, liquid can be drawn up and/or delivered in defined quantities. At least two channels (33, 36, 38) are provided in the valve-system, which can be connected with at least one opening (32) in the cylinder bottom (11). The piston (12) is displaceable within the cylinder (10) by means of an actuation device (3). The cylinder (10) is at the same time surrounded by a holding device (5, 40), in which it is mounted in bearings to rotate with the cylinder bottom (11) around an axis common to the longitudinal axis of the cylinder (Y) or parallel to it. The cylinder bottom (11), with at least two channel openings (29, 30, 31), rests with a sealed seating upon a valve element (28). Through rotation of the cylinder bottom (11), its opening (32) can alternately be aligned with the channel openings (29, 30, 31) of the valve element (28).

12 Claims, 2 Drawing Sheets

VOLUME MEASUREMENT AND DOSAGE DEVICE

BACKGROUND OF THE INVENTION

1. Field of the Invention

The invention concerns a volume measuring and dosage device according to the preamble of claim 1.

2. Description of the Prior Art

Such volume measurement and dosage devices are already known in many versions and in the most varied applications. In practice they are mostly employed for the delivery of liquids out of supply containers, for the transfer of liquids and/or to mix liquids in defined proportions. For example, EP-A-96 088 describes a flask-cap piston burette, with which liquid can be withdrawn from a container by means of a cylinder-piston-valve-system, and delivered with a specific dosage. The actuation of the cylinder-piston system is achieved manually. The flow of liquid is alternately so obstructed, that suction out of the container and delivery through an outlet tube is alternately possible.

GB-PS-1,481,521 describes an arrangement with which numerous different liquids can be drawn up into one cylinder-piston-system and delivered again through a common outlet tube. The control of the liquid ensues by means of a slider-valve-system, by which numerous channels in the slider of the valve-system can be alternately connected to either outlet or inlet tubes.

The applicant's own EP-B-188 453 makes a device known for determination of liquid quantities, whereby the bottom of a cylinder is equipped with channels. These channels are led through the cylinder bottom without a blocking device, and finish as openings on its inside, whereby the end wall of the cylinder rests with a sealing fit on the cylinder bottom, in order to close off the openings. Through the relative displacement of the cylinder bottom, the openings in the cylinder bottom can be exposed or obstructed.

This known device is exceptionally suitable for analysis. However, the mechanical complexity for relative movement of the cylinder bottom and the cylinder wall is relatively high. Apart from that, the arrangement normally demands, for drive reasons, a fixed connection between the actuation device and the cylinder-piston-valve-device. In practice it can be desirable to design the arrangement in such a way that the actuation device can easily be separated from the piston and valve system, in order, for example, to connect cylinder-piston-systems with differing volumes onto the same actuation device (e.g. an electronically controlled motor drive.)

In addition, the device according to the previously described invention should be easy to dismantle, so that the cylinder and piston can be exchanged (e.g. for purposes of adjustment to differing volumes). The cylinder-, piston-, and valve-system should also be easily accessible and interchangeable for cleaning purposes.

Additionally, the operation of the valve system should be as simple as possible, as well as being able to be carried out both manually and with a drive motor.

SUMMARY OF THE INVENTION

According to the invention, this is primarily achieved according to the characteristics of the patent claims.

By mounting the cylinder and the cylinder bottom in a rotatable holding device, the valve becomes self operating in the simplest way through rotation of the cylinder. The valve comprises solely the cylinder bottom and a valve element and each preferred valve position can be optimally simply adjusted through rotation of the cylinder together with the cylinder bottom. With that, constructively, it is especially appropriate if the opening or the openings in the cylinder bottom are arranged eccentrically in relation to the rotational axis. By this means different openings (or pairs of openings) can be aligned. The rotation of the cylinder in the holding device can be achieved either manually or very simply with a motor. Stop-notch and/or display systems can be provided to give a clear indication of the respective valve position, especially in the case of manual rotation. Naturally, the cylinder bottom can be provided with numerous openings which are aligned with different openings in the valve element. This will depend on the particular application.

It is especially advantageous if the cylinder is enclosed by a holding device and fixing device that interlocks with the cylinder and/or the cylinder bottom and is mounted on bearings in order to rotate with the cylinder. At the same time, the fixing device can serve as a mounting element which, during operation, can position the cylinder and the cylinder bottom in relation to the valve element, and still permit, however, separation of the components for purposes of replacement or cleaning. It is particularly advantageous and effective if the cylinder and/or the cylinder bottom comprises a ceramic material, and if these components are held together and sealed by the holding device or the housing. The desirable application of ceramic materials is made possible through the holding device or a housing serving as a holding device, with its simple cleaning or handling.

The invention can be particularly universally applied if the actuation device is provided with a drive connection that enables separation from the cylinder-piston-valve-system. Numerous cylinder-piston-systems can be driven from only one actuation device, particularly if the drive device exhibits an electric/electronic drive for the piston and/or the rotational movement of the cylinder.

It is at the same time especially advantageous if a device is provided on the cylinder-piston-valve-system in the region of the drive connection, preferably on the upper contact surface, which indicates the volume of the cylinder-piston-valve-system to the actuation device. It is an advantage if this is achieved by arranging a permanent magnet on the cylinder-piston-valve-system in the area adjacent to the actuation device, which is positioned and/or shaped and/or has a strength that is adjustable to the respective volume of the cylinder. If the actuation device is now provided with an electromagnetic sensor, for example a coil, a reed relay or a transmitter, a signal can thus be transmitted in a conventional way, without contact, which "indicates" the volume of the cylinder to the actuation device. When one of the thus adjusted motor drives of the piston actuation device is actuated, the corresponding piston volume can automatically be allowed for at each piston stroke.

The drive connection of the cylinder-piston-valve system and the actuation device can be especially simply and practically achieved if two coaxial drive connection arrangements are provided, of which the inner serves as a connection for the piston drive, and the outer is intended as a connection for the rotation of the cylinder or—for actuation of the valve—the cylinder bottom.

In practice it is obviously conceivable to actuate the cylinder instead of the piston, as described in EP-A-96 088.

The actuation device can be realised in any preferred way, for example mechanically, as described in the aforementioned EP-A. For the automation of the dosage procedure it is, however, an advantage if a motor drive is provided at least for the cylinder, as suggested in connection with EP-B-188 453. The valve position can be manually actuated, even in the case of a motorised drive. However, if the automation of the dosage procedure is being considered, it is an advantage if the actuation of the valve system through rotation of the cylinder or the cylinder bottom ensues with motor drive.

BRIEF DESCRIPTION OF THE DRAWINGS

The invention is more closely depicted in the drawings in the following versions. Namely.

DETAILED DESCRIPTION OF THE INVENTION

Figure 1:
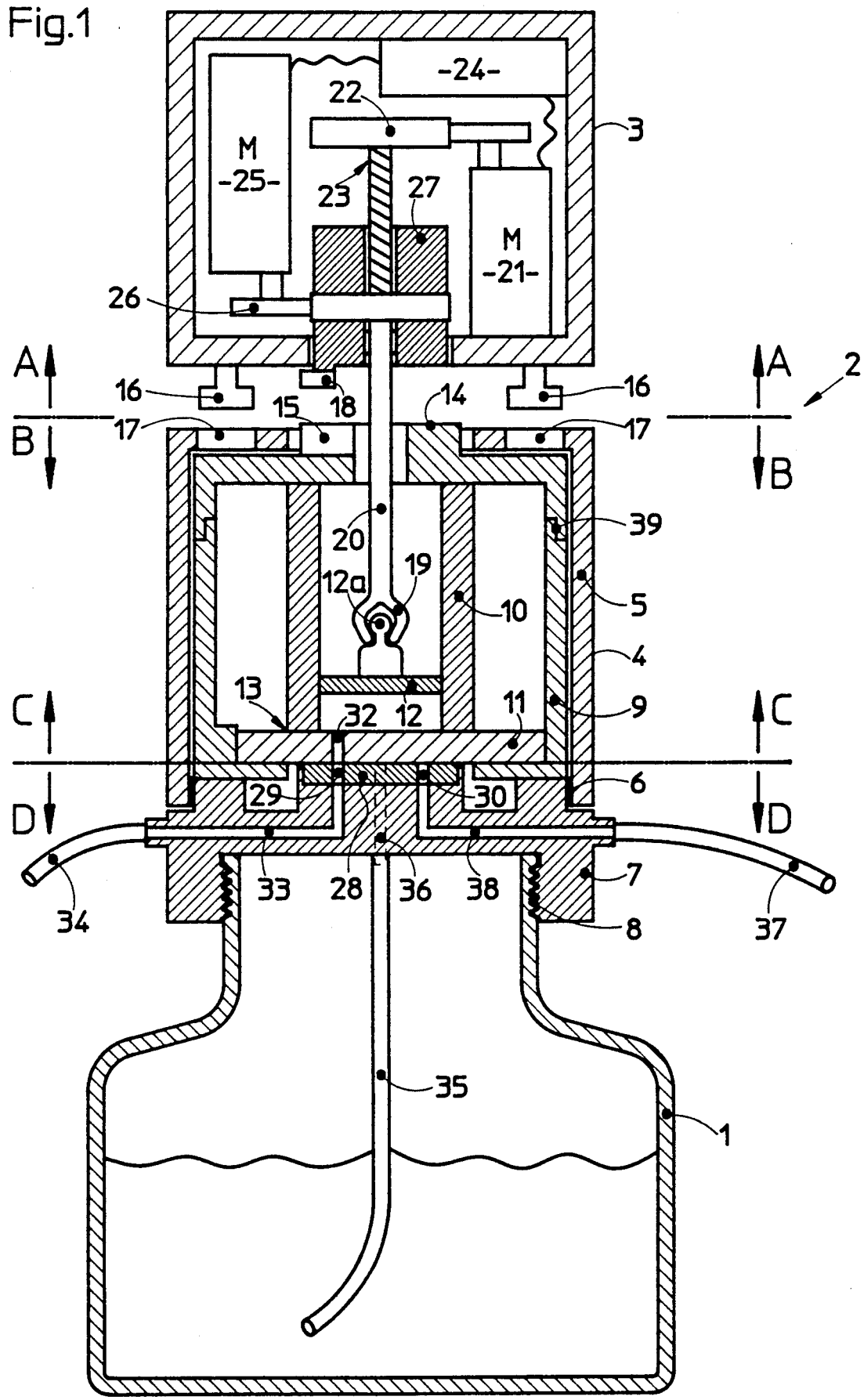
FIG. 1: a schematic representation of a volume measurement and dosage device, with the features on the invention in cross section.

According to FIG. 1, a volume measuring and dosage device 2 is screwed onto a container 1, which comprises and actuation device 3 and a cylinder-piston- and valve-system 4. The system 4 possesses a cylindrical housing 5 which is connected through a threaded connector 6 with a cylindrical attachment part 7. The attachment part 7 is screwed on to the container 1 by means of an inner thread 8—if nescessary with an intermediate ring. A cylindrical fixing device 9 is mounted on bearings to rotate in the housing 5. The housing 5 holds together a cylinder 10 and a cylinder bottom 11 with contact force in such a way, that when the piston 12 is displaced no liquid can escape in the region of the seal 13 between the cylinder bottom 11 and the cylinder 10.

Figure 2:
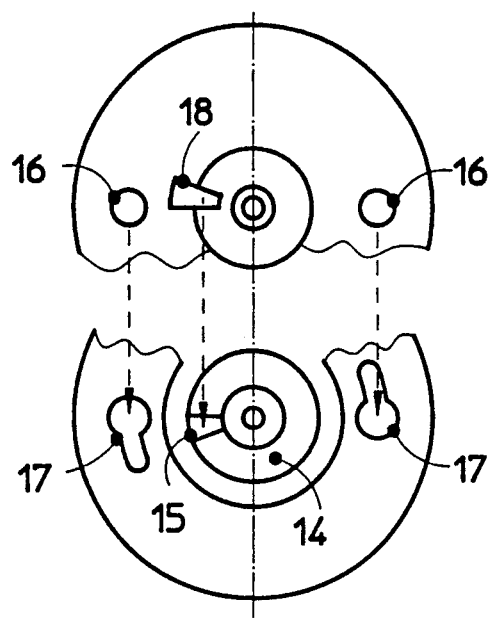
FIG. 2: a plan view of the actuation device and the cylinder-piston-valve-system, in the direction of the arrows A—A and B—B marked on FIG. 1.

The fixing device 9 is provided with a protrusion 14 on its upper side, which possesses a key-slot (FIG. 2).

The actuation device 3 and cylinder-piston-valve system 4 are, for the purposes of representation, shown separately in FIGS. 1 and 2. In operation the actuation device 3 would be interlocked with the system 4 by means of studs 16 which engage with the slots 17. With that, a driver 18 extends sufficiently into the slot 15 to provide an interlocking rotational connection. At the same time a connection element 19 fits over a connection ball 12a so that the piston 12 is connected with the drive shaft 20. As soon as this connection is made, the piston 12 can be either raised or lowered through the action of a motor 21 in the actuation device 3. For this purpose the motor 21 is connected with the drive shaft 20 through a transmission 22. The transmission 22 encompasses, by means of a thread, the drive shaft which is provided with an outer thread 23, so that the drive shaft 20, which is prevented from rotating in its bearings, can be either raised or lowered through engagement of the threads. Such drive systems are in everyday use, and therefore need not be further explained here. With that, the motor 21 is controlled by an automatic control device 24, so that the stroke travel of the piston 12 can be coordinated with the volume of liquid to be delivered. The control device 24 can at the same time be controlled by a conventional means through either an internal or external operating device, for example also a microprocessor, as is already the case with burettes. A second motor 25 is provided in the actuation device 3, which drives a cylindrical sleeve 27 by means of a toothed wheel, onto which is also attached the driver 18. As soon as the sleeve rotates, this rotational movement is transmitted to the fixing device 9 through the driver 18 and the slot 15, and thus to the cylinder 10 and the cylinder bottom 11.

Figure 3:
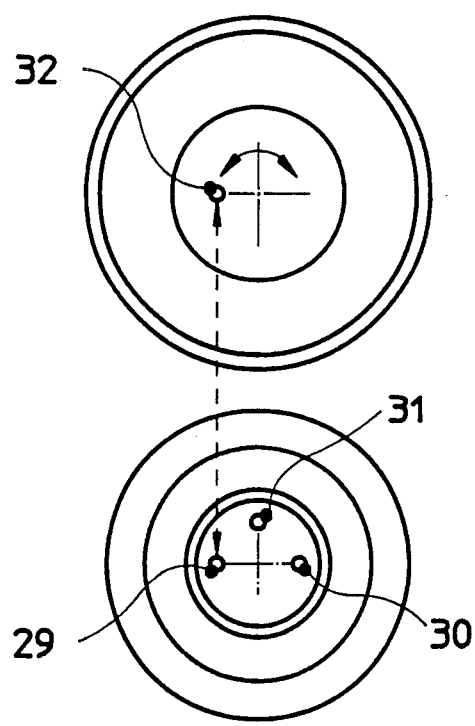
FIG. 3: a plan view in the direction of the arrows C—C and D—D marked on FIG. 1.

The cylinder bottom with its sealed seating is pressed by the housing 5 against a valve element 28. The channel openings 29, 30, 31 (FIG. 3) are located in the valve element 28, which are alternately brought into alignment with an with an opening 32 in the cylinder bottom 11, according to the rotational position of the cylinder bottom 11. In the case of the position according to FIG. 1, the chamber contents of the cylinder 10 communicate therefore through the opening 32 in the cylinder bottom 11 and the opening 29 in the valve element 28 with a channel 33, which is connected to a tube 34. The contents of the cylinder 10 and thus be expelled through the tube 34.

If, for example, as a subsequent working step, liquid is drawn into the cylinder 10 out of the container 1 through a tube 35, the motor 25 is actuated, which, through the gear wheel 26, sleeve 27, driver 18, slot 15 and fixing device 9, rotates the cylinder 10 and the cylinder bottom 11 around its longitudinal axis in such a way that the bore 32 in the cylinder bottom 11 aligns with the opening 31 in the valve element 28. In this rotational position the inside of the cylinder 10 communicates through the channel 36 with the tube 35. Through activation of the motor 21 and raising of the piston 12 by means of the drive shaft 20 the liquid can be drawn up out of the container 1. When subsequently the liquid, which has been drawn up into the cylinder 10, should be delivered through a tube 37, the fixing device 9 must merely be rotated in the way already described by means of the motor 25, and through that the opening 32 is brought into line with the opening 30 so that the cylinder communicates with the channel 38, which is connected to the tube 37.

In order to mount the fixing device 9 to rotate in bearings in the housing 5, at least fixing device 9 is made from a low friction material (Plastic). The fixing device 9 is at the same time formed in two parts and separable at one connecting point 39, so that the cylinder 10 and the piston 12 are easily accessible. The whole arrangement can consequently be easily opened for cleaning, for example. The cylinder bottom 11 and the cylinder 10 are made from a ground ceramic material. Since the cylinder 10 only rests on the sealing area 13 and is not connected to it, after the fixing device 9 is opened, the cylinder 10 and the piston 12 can be easily exchanged with other cylinder-piston combinations, (also with differing volumes/diameters.)

Figure 4:
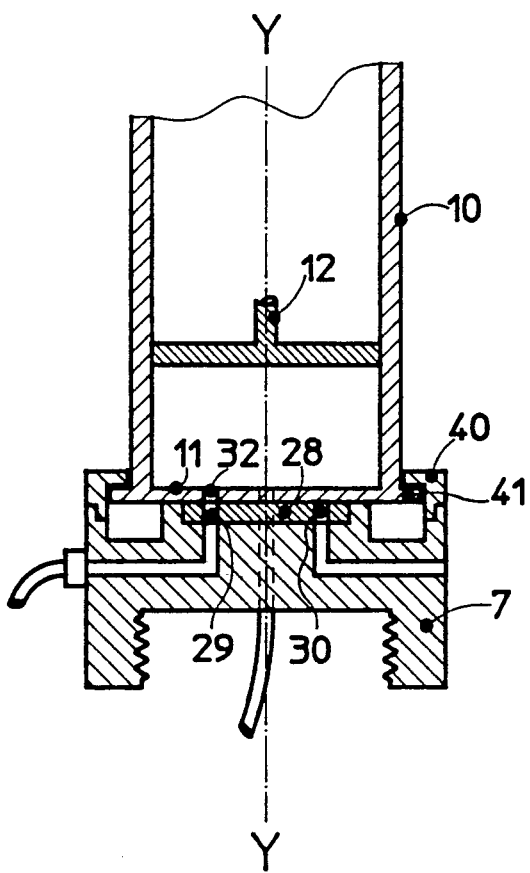
FIG. 4: a cross section through a modified cylinder-piston- and valve-system.

FIG. 4 shows a modified version which differs from the version according to FIG. 1 in that the cylinder 10 is firmly fixed to the cylinder bottom 11. An attachment part 7 with an annular holding device 40 is provided which is overlapped by an annular protrusion 41. In this way the cylinder bottom 11 is pressed to seal against the valve element 28. On the other hand the cylinder 10, with the cylinder bottom 11, is mounted to rotate in bearings in the holding 40, so that the opening 32 in the cylinder bottom can be aligned in an equivalent way to the version according to FIG. 1, with openings 29, 30, 31 in valve element 28. In the case of the version depicted in FIG. 4, the cylinder 10 is not surrounded by a housing, so that the cylinder can be rotated manually in order to achieve the desired valve position. In order to provide clearly defined positioning, stop-notches can be provided between the holding device 40 and the annular protrusion 41, which in each case engage on acquiring a flow through position. These kinds of stop-notch, for example ball-notch elements, are conventional and therefore do not require closer explanation.

In FIG. 4 no actuation device is shown for reasons of clarity. With this version either a motor driven actuation device can be provided for the piston 12 or a conventional manual actuation arrangement can be used.

Figure 5:
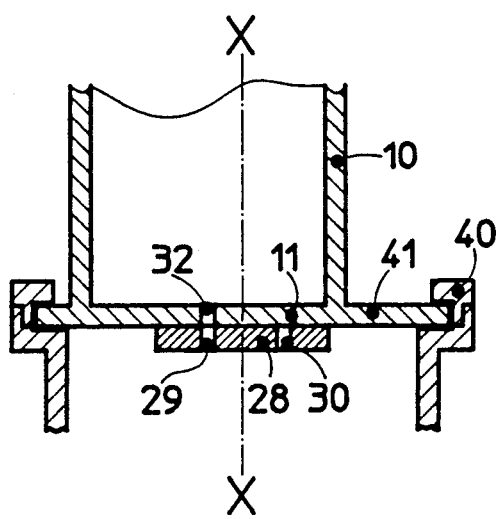
FIG. 5: a representation of a modified valve-system in cross section.

FIG. 5 shows a version where the cylinder 10 is arranged eccentrically on the protrusion 41. In spite of the fact that the opening 32 is provided in the center of the cylinder bottom 11, it is arranged eccentrically in relation to the rotational axis X. Thus each rotation of the cylinder about the longitudinal axis X leads to a repositioning of the opening 32 above one of the openings 29 or 30.

The arrangement according to FIG. 5 can be especially easily rotated. Additionally the corresponding valve position will be visually clearly distinguishable through the eccentric design.

Naturally the illustrated versions are not limited to a cylinder bottom that possesses only a single opening 32. It is for the user to decide, according to his requirements, how many of these types of openings he wishes to provide in the cylinder bottom 11 or in the valve element 28. On the basis of the disc shaped arrangement it is especially easy to realise with minimum effort even the most complicated valve arrangements, possessing a large number of communicating openings or channels. The valve comprises, at the same time, in principle only the valve element 28 and the cylinder bottom 11. Both are easily accessible, simple to clean and also exchangeable.

We claim:

1. A volume measurement and dosage device comprising
   a cylinder having a longitudinal axis and an end closure having an opening therein, said cylinder being supported about an axis of rotation,
   a valve system comprising means defining at least two separate channels for fluid flow, a stationary valve element connected to each of said channels and having plural apertures therein,, one communicating with each of said channels, said cylinder end being in contact with the valve element, the apertures thereof being arranged so that said cylinder opening can be aligned with any of said apertures by rotating the cylinder,
   a piston within the cylinder for displacing fluid in the cylinder, and
   an actuating system for moving the piston relative to the cylinder to displace said liquid through said opening, thereby producing aspiration or delivery of the liquid through the passage aligned with the opening.

2. A device according to claim 1, wherein the opening in the cylinder end is eccentric relative to the rotational axis.

3. A device according to claim 1, further comprising a fixing device surrounding the cylinder, which engages with an interlocking form fit with the cylinder, and means for supporting the fixing device for rotation with the cylinder.

4. A device according to claim 3, wherein the opening in the cylinder end is eccentric relative to the rotational axis.

5. A device according to claim 4, further comprising
   a fixing device surrounding the cylinder, and having an interlocking fit with the cylinder, and
   means supporting the fixing device for rotation with the cylinder.

6. A device according to claim 4, wherein at least one of the cylinder and the cylinder end comprise a ceramic material and wherein the cylinder end and cylinder are held together by the housing so as to be sealed together.

7. A device according to claim 6, wherein the actuation device comprises a drive connection which can be separated from the cylinder, piston and valve system.

8. A device according to claim 7, wherein the actuation device comprises two drive connections, of which one can be brought into operating relationship with the piston and the other with the cylinder end or the fixing device.

9. A device according to claim 6, wherein the actuation device comprises two drive connections, of which one can be brought into operating relationship with the piston and the other with the cylinder end or the fixing device.

10. A device according to claim 9, wherein said drive connections are coaxial.

11. A device according to claim 5, wherein said cylinder is arranged to be interchangeable in the holding device.

12. A device according to claim 3, wherein said cylinder is arranged to be interchangeable in the fixing device.

* * * * *